United States Patent
Tanaka

(10) Patent No.: US 7,352,562 B2
(45) Date of Patent: Apr. 1, 2008

(54) SURFACE-MOUNT SOLID ELECTROLYTIC CAPACITOR AND PROCESS FOR MANUFACTURING SAME

(75) Inventor: Eisaku Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/579,573

(22) PCT Filed: Sep. 17, 2004

(86) PCT No.: PCT/JP2004/013635

§ 371 (c)(1),
(2), (4) Date: May 17, 2006

(87) PCT Pub. No.: WO2005/055258

PCT Pub. Date: Jun. 16, 2005

(65) Prior Publication Data

US 2007/0081301 A1    Apr. 12, 2007

(30) Foreign Application Priority Data

Dec. 1, 2003  (JP) .............................. 2003-401994

(51) Int. Cl.
*H01G 4/228* (2006.01)
*H01G 9/00* (2006.01)

(52) U.S. Cl. ....................... 361/540; 361/533; 29/25.03

(58) Field of Classification Search ................ 361/525, 361/532–533, 535–536, 538, 540
See application file for complete search history.

(56) References Cited

U.S. PATENT DOCUMENTS 4,488,204 A * 12/1984 Beck, Jr. .................... 361/540
6,751,086 B2   6/2004 Matsumoto
6,870,727 B2 * 3/2005 Edson et al. ................ 361/523
2003/0045032 A1   3/2003 Abe

FOREIGN PATENT DOCUMENTS

| JP | 2002-43175  | 2/2002 |
| JP | 2002-175952 | 6/2002 |
| JP | 2003-68576  | 3/2003 |
| JP | 2003-78094  | 3/2003 |

* cited by examiner

*Primary Examiner*—Eric Thomas
(74) *Attorney, Agent, or Firm*—Hamre, Schumann, Mueller & Larson, P.C.

(57) ABSTRACT

A solid electrolytic capacitor includes a capacitor element 2, an anode lead terminal 3 electrically connected to an anode of the capacitor element, a cathode lead terminal 4 electrically connected to a cathode of the capacitor element, and a package 5 which is made of synthetic resin and hermetically seals the capacitor element. The lead terminals are embedded in the bottom 5a of the package with the lower surfaces of the lead terminals exposed at the bottom surface of the package. The anode lead terminal and the cathode lead terminal are respectively formed with standing pieces 8 and 9 at portions corresponding to side surfaces 5b, 5c of the package, and the standing pieces have respective outer surfaces exposed at the side surfaces of the package. This structure enhances the soldering strength and facilitates the visual inspection of the quality of the soldering.

4 Claims, 8 Drawing Sheets

SURFACE-MOUNT SOLID ELECTROLYTIC CAPACITOR AND PROCESS FOR MANUFACTURING SAME

TECHNICAL FIELD

The present invention relates to a solid electrolytic capacitor which includes a capacitor element hermetically sealed in a package made of synthetic resin. The present invention particularly relates to a surface-mount solid electrolytic capacitor to be mounted on e.g. a printed circuit board by soldering, and also to a method for manufacturing such a solid electrolytic capacitor.

BACKGROUND ART

In a typical surface-mount solid electrolytic capacitor, an anode lead terminal and a cathode lead terminal which are made of a metal plate for electrical connection to an anode and a cathode of the capacitor element, respectively, are arranged at the bottom side of the synthetic resin package hermetically sealing the capacitor element. With such an arrangement, the capacitor can be mounted on e.g. a printed circuit board by soldering utilizing the two lead terminals.

In such a surface-mount solid electrolytic capacitor, each of the lead terminals projects out from a side surface of the package and is bent toward the bottom surface of the package. With such a structure, the entire height of the capacitor from the lower surface of the lead terminal to the upper surface of the package disadvantageously increases.

The Patent Document 1 as a prior-art proposes to embed the anode and the cathode lead terminals in the bottom of the resin package so that the lower surfaces of the two lead terminals are exposed at the bottom surface of the package.

Patent Document 1: JP-A-2003-68576

DISCLOSURE OF THE INVENTION

Problems to be Solved by the Invention

With the above-described prior-art structure, the entire height of the capacitor is considerably reduced by embedding the two lead terminals in the package. However, in mounting the capacitor on e.g. a printed circuit board, only the lower surfaces of the lead terminals are actually soldered, and the bulging of a solder fillet hardly occurs. Therefore, the soldering strength is not sufficient. Further, because of the absence of the solder fillet, it is difficult to visually inspect the quality of soldering.

Means for Solving the Problems

A first aspect of the present invention relates to the structure of a solid electrolytic capacitor. The surface-mount solid electrolytic capacitor according to the first aspect comprises a capacitor element provided with an anode and a cathode, an anode lead terminal which is made of a metal plate and electrically connected to the anode of the capacitor element, a cathode lead terminal which is made of a metal plate and electrically connected to the cathode of the capacitor element, and a package which is made of synthetic resin and hermetically seals the capacitor element. The lead terminals are embedded in a bottom of the package with lower surfaces of the lead terminals exposed at a bottom surface of the package. The anode lead terminal and the cathode lead terminal are respectively formed with standing pieces at portions corresponding to side surfaces of the package, and the standing pieces have their outer surfaces exposed at the side surfaces of the package.

In this way, the anode lead terminal and the cathode lead terminal embedded in the bottom of the package so as to expose the lower surfaces thereof are provided with standing pieces. Specifically, the anode lead terminal and the cathode lead terminals are embedded in the package so that the outer surfaces of the standing pieces are exposed. With such a structure, in mounting the capacitor to a printed circuit board by soldering, the molten solder bulges up to the outer surfaces of the standing pieces. The bulging of the solder fillet considerably increases the soldering strength and makes it possible to visually inspect the quality of the soldering easily and reliably.

In the first aspect, each of the standing pieces may be formed at limited part of the corresponding lead terminal in a width direction. With such an arrangement, in comparison with the case where the standing piece is formed along the entire width of the lead terminal, the working for forming the standing piece is easy, and the weight can be reduced.

A second aspect of the present invention relates to a manufacturing method. The method for manufacturing a surface-mount solid electrolytic capacitor according to the second aspect comprises a step of preparing a lead frame by punching a metal plate, so that the lead frame includes a pair of side frame portions integrally connected to each other by a tie bar, one of the side frame portions being formed with an anode lead terminal, the other one of the side frame portions being formed with a cathode lead terminal. The method further comprises the step of: removably bonding a tape to the lead frame so that the tape crosses the anode lead terminal, the cathode lead terminal and the tie bar; separating the anode lead terminal and the cathode lead terminal from the respective side frame portions and then bending an end of each of the anode lead terminal and the cathode lead terminal to form a standing piece; mounting a capacitor element onto the anode lead terminal and the cathode lead terminal so that an anode and a cathode of the capacitor element are electrically connected to the anode lead terminal and the cathode lead terminal, respectively; molding a synthetic resin into a package for hermetically sealing the capacitor element so that the lead terminals are embedded in the package with a surface of each of the lead terminals and an outer surface of each of the standing pieces exposed; and removing the tape.

A third aspect of the present invention relates to another manufacturing method. The method for manufacturing a surface-mount solid electrolytic capacitor according to the third aspect comprises the steps of: preparing a lead frame by punching a metal plate, the lead frame including a pair of side frame portions integrally connected to each other by a tie bar, one of the side frame portions being formed with an anode lead terminal while the other one of the side frame portions being formed with a cathode lead terminal; forming a standing piece at each of the anode lead terminal and the cathode lead terminal of the lead frame without separating the anode lead terminal and the cathode lead terminal from the respective side frame portions; mounting a capacitor element onto the anode lead terminal and the cathode lead terminal so that an anode and a cathode of the capacitor element are electrically connected to the anode lead terminal and the cathode lead terminal, respectively; molding a synthetic resin into a package for hermetically sealing the capacitor element so that the lead terminals are embedded in the package with a surface of each of the lead terminals and an outer surface of each of the standing pieces exposed; and separating the anode lead terminal and the cathode lead terminal from the respective side frame portions.

With the above-described manufacturing methods, the solid electrolytic capacitor having the structure described above can be manufactured at a low cost by utilizing a lead frame. Particularly, the manufacturing method of the third aspect can further reduce the manufacturing cost, because it does not require a tape unlike the method of the second aspect.

Other objects, features and advantages of the present invention will become apparent from the description given below with reference to the accompanying drawings.

BEST MODE FOR CARRYING OUT THE INVENTION

Preferred embodiments of the present invention will be described below with reference to the accompanying drawings.

Figure 1:
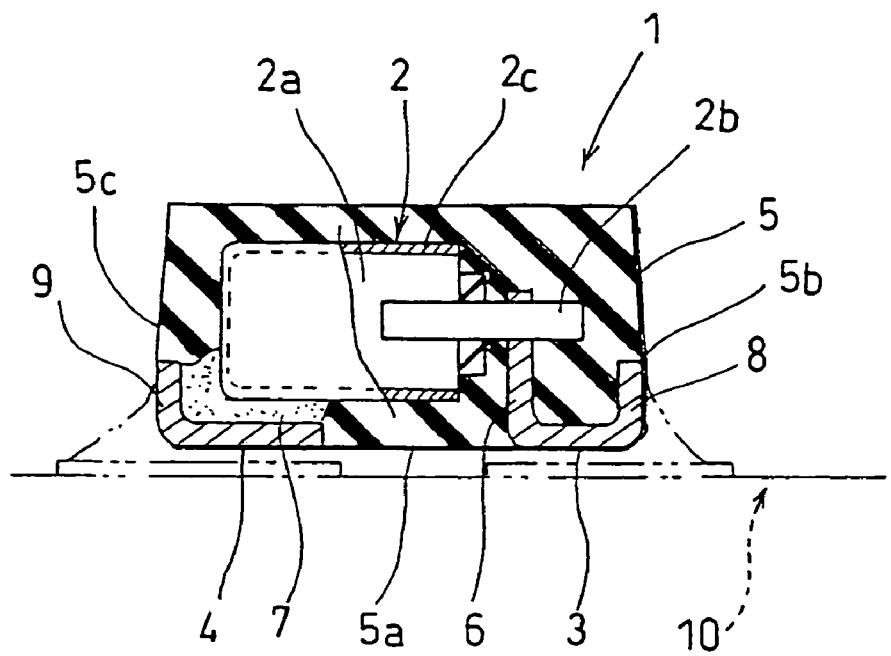
FIG. 1 is a vertical sectional view showing a solid electrolytic capacitor according to a first embodiment of the present invention.
Figure 2:
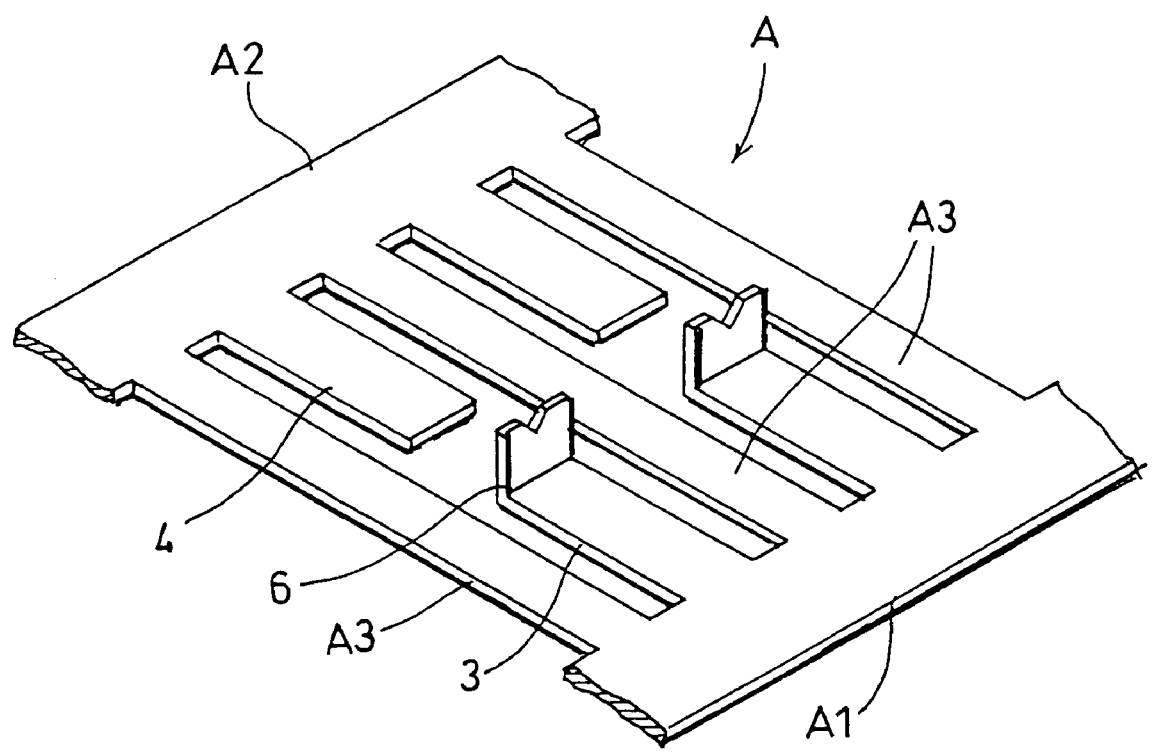
FIG. 2 is a perspective view showing a lead frame used for manufacturing the solid electrolytic capacitor of the first embodiment.

FIGS. 1 and 2 show a solid electrolytic capacitor according to a first embodiment of the present invention.

The solid electrolytic capacitor 1 includes a capacitor element 2, an anode and a cathode lead terminals 3 and 4 made of a metal plate, and a package 5 made of synthetic resin for hermetically sealing the entirety of the capacitor element 2.

The capacitor element 2 comprises a porous chip body 2a, an anode bar 2b projecting from an end surface of the chip body 2a, and a cathode film 2c formed on a peripheral surface of the chip body 2a.

The anode lead terminal 3 and the cathode lead terminal 4 are generally aligned. The capacitor element 2 is arranged between the anode lead terminal 3 and the cathode lead terminal 4, with the anode bar 2b oriented toward the anode lead terminal 3. The anode lead terminal 3 is formed with a bent piece 6 to which the anode bar 2b of the capacitor element 2 is bonded by e.g. welding so that the anode bar 2b is electrically connected to the anode lead terminal 3. The chip body 2a of the capacitor element 2 is bonded to the cathode lead terminal 4 via conductive paste 7 so that the cathode film 2c on the chip body 2a is electrically connected to the cathode lead terminal 4.

Respective outer ends of the anode lead terminal 3 and the cathode lead terminal 4 are bent upward to integrally provide standing pieces 8 and 9.

The entirety of the capacitor element 2 is hermetically sealed in the package 5, and the lead terminals 3 and 4 are embedded in the package 5, with the lower surfaces of the lead terminals 3 and 4 exposed at a bottom surface 5a of the package body 5 whereas outer surfaces of the standing pieces 8 and 9 of the lead terminals 3 and 4 exposed at side surfaces 5b and 5c of the package body 5, respectively.

In mounting the solid electrolytic capacitor 1 having the above-described structure to a printed circuit board 10 by soldering, the lower surfaces of the lead terminals 3 and 4, which are exposed at the bottom surface 5a of the package body 5, are soldered to the printed circuit board. Additionally, as indicated by double-dot lines in FIG. 1, part of the molten solder bulges up to the outer surfaces of the standing pieces 8 and 9 exposed at the side surfaces 5b and 5c of the package body 5 and solidifies in the bulged state. The bulging of the solder fillet considerably increases the soldering strength as compared with the case where only the lower surfaces of the lead terminals 3 and 4 are soldered, whereby it is possible to visually inspect the quality of the soldering.

Since the standing piece 9 is provided at the cathode lead terminal 4, the cathode lead terminal 4 can hold a large amount of conductive paste 7 on the upper surface thereof in bonding the chip body 2a of the capacitor element 2 to the cathode lead terminal 4 via the conductive paste 7. Therefore, the strength of bonding by the conductive paste 7 is ensured.

To manufacture the solid electrolytic capacitor 1 having the above-described structure, it is preferable to employ the method described below.

As a first step, a lead frame A shown in FIG. 2 is prepared by punching a non-illustrated metal plate.

The lead frame A includes a pair of side frame portions A1 and A2 which are integrally connected to each other by tie bars A3 spaced from each other. Between respective adjacent tie bars A3, an anode lead terminal 3 integrally extending inward from the side frame portion A1 and a cathode lead terminal 4 integrally extending inward from the side frame portion A2 are provided. One end of each of the anode lead terminals 3 is bent upward to provide a bent piece 6.

Figure 3:
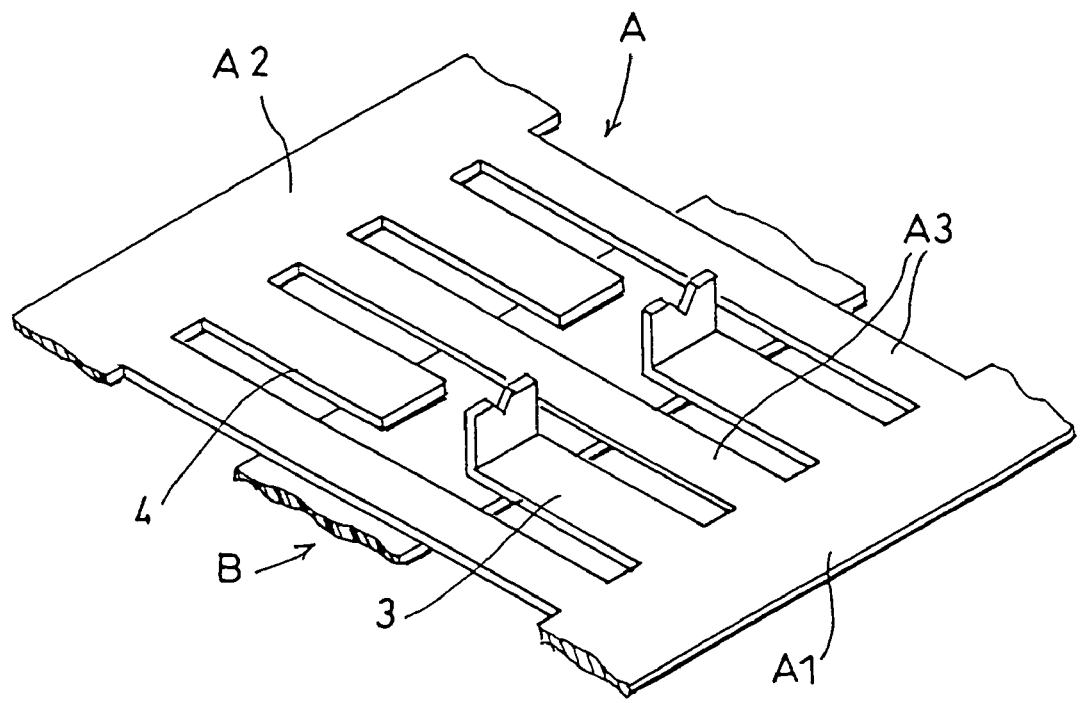
FIG. 3 is a perspective view showing a first step to manufacture the solid electrolytic capacitor of the first embodiment.

As a second step, as shown in FIG. 3, a tape B is bonded to the lower surface of the lead frame A so as to cross the anode lead terminals 3, the cathode lead terminals ·4 and the tie bars A3.

Figure 4:
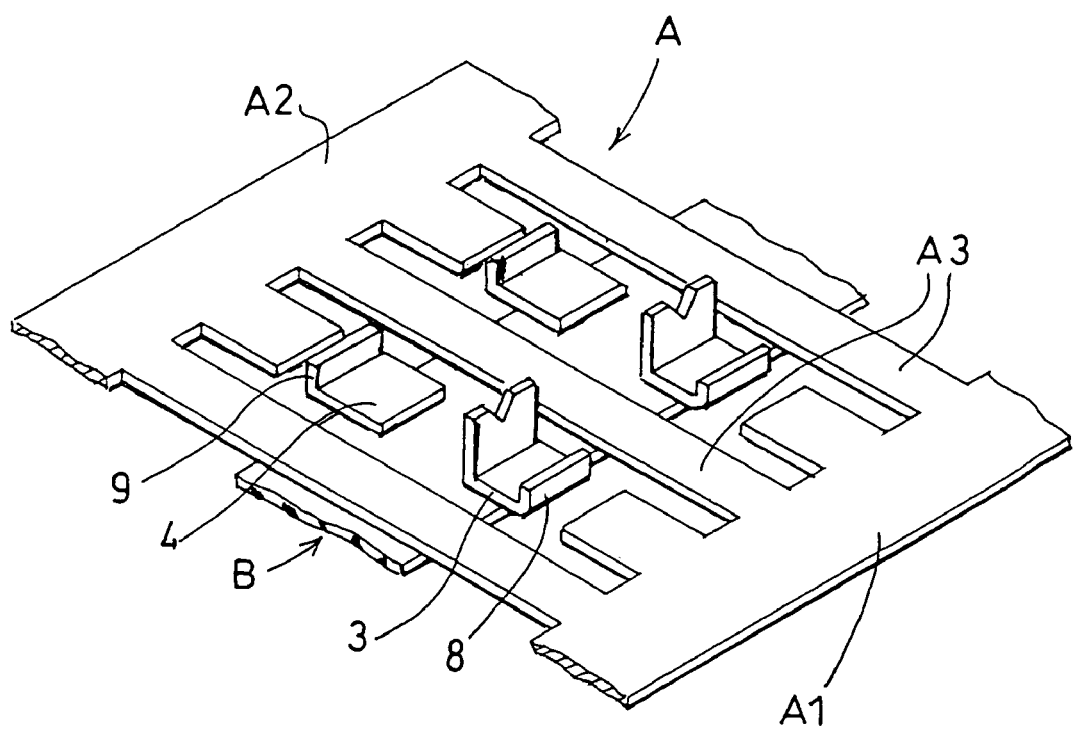
FIG. 4 is a perspective view showing a second step to manufacture the solid electrolytic capacitor of the first embodiment.
Figure 5:
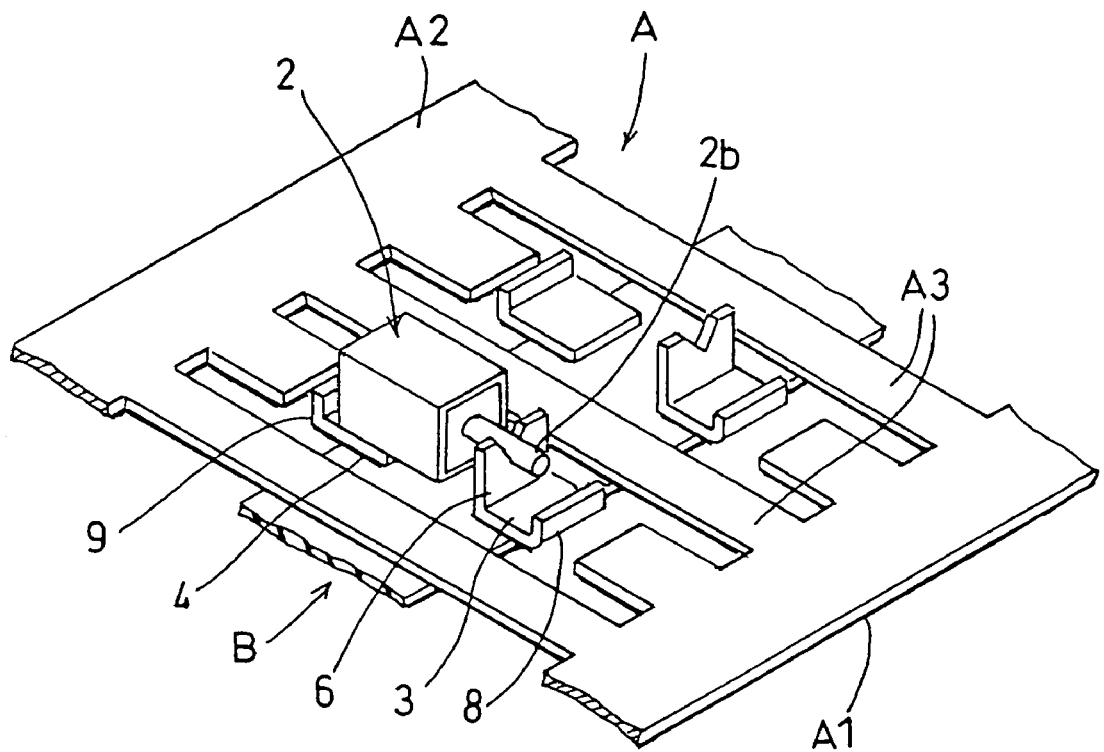
FIG. 5 is a perspective view showing a third step to manufacture the solid electrolytic capacitor of the first embodiment.
Figure 6:
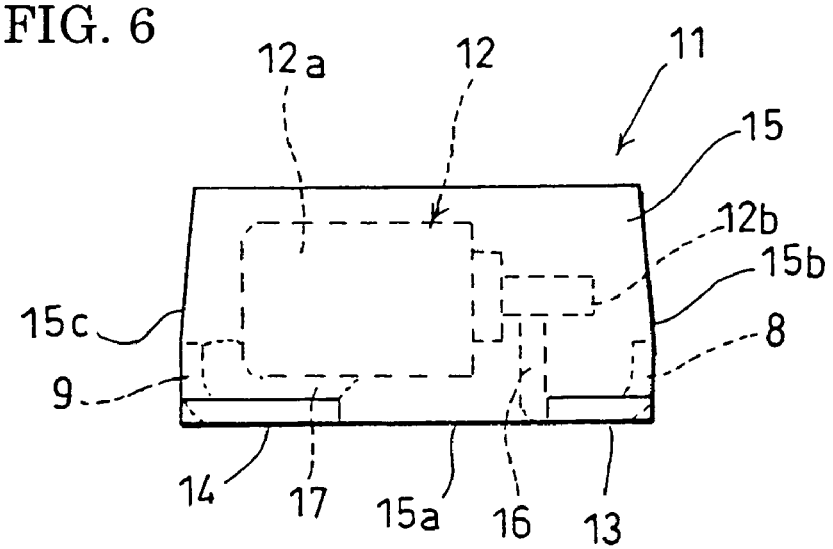
FIG. 6 is a front view showing a solid electrolytic capacitor according to a second embodiment of the present invention.
Figure 7:
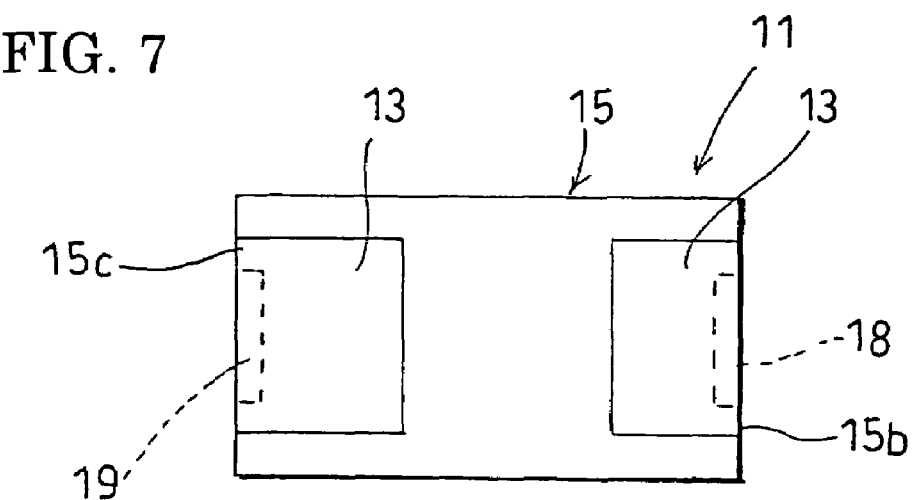
FIG. 7 is a bottom view of FIG. 6.
Figure 8:
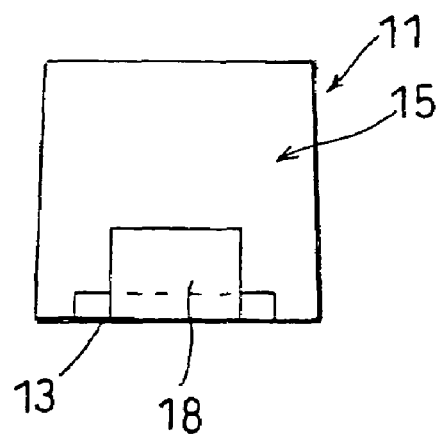
FIG. 8 is a right side view of FIG. 6.
Figure 9:
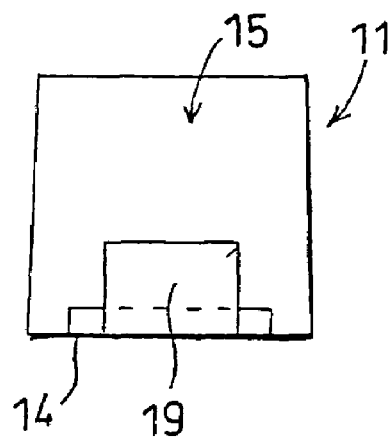
FIG. 9 is a left side view of FIG. 6.

As a third step, as shown in FIG. 4, the anode lead terminals 3 and the cathode lead terminals 4 are separated from the respective side frame portions A1 and A2, and respective outer ends of the terminals are bent upward to provide standing pieces 8 and 9.

Subsequently, as a fourth step, a capacitor element 2 is placed between the anode lead terminal 3 and the cathode lead terminal 4. The anode bar 2b is bonded to the bent piece 6 of the anode lead terminal 3, whereas the chip body 2a is bonded to the upper surface of the cathode lead terminal 4 using conductive paste 7.

Subsequently, as a fifth step, a package 5 for hermetically sealing the entirety of the capacitor element 2 is formed by transfer molding of synthetic resin.

The molding is so performed that the lower surface of the lead terminals 3 and 4 are exposed at the bottom surface 5a of the package 5 whereas the outer surfaces of the standing pieces 8 and 9 are exposed at the side surfaces 5b and 5c of the package 5.

Subsequently, as a sixth step, the tape B is removed from the lead frame A and the package 5, whereby a solid electrolytic capacitor 1 having the structure shown in FIG. 1 is obtained.

The above-described process steps may be performed in the order of the first step, the fourth step, the second step, the third step, the fifth step and the sixth step.

FIGS. 6-9 show a solid electrolytic capacitor 11 according to a second embodiment.

Similarly to the solid electrolytic capacitor of the first embodiment, the solid electrolytic capacitor 11 includes a capacitor element 12, an anode and a cathode lead terminals 13 and 14 made of a metal plate, and a package 15 made of synthetic resin for hermetically sealing the entirety of the capacitor element 12.

The anode lead terminal 13 and the cathode lead terminal 14 are generally aligned. The capacitor element 12 is arranged between the anode lead terminal 13 and the cathode lead terminal 14, with the anode bar 12b oriented toward the anode lead terminal 13. The anode lead terminal 13 is formed with a bent piece 16 to which the anode bar 12b of the capacitor element 12 is bonded by e.g. welding so that the anode bar 12b is electrically connected to the anode lead terminal 13. The chip body 12a of the capacitor element 12 is bonded to the cathode lead terminal 14 via conductive paste 17 so that the cathode film 12c on the chip body 12a is electrically connected to the cathode lead terminal 14.

The anode and the cathode lead terminals 13 and 14 are embedded in the bottom of the package 15, which seals the entirety of the capacitor element 12, so that the lower surfaces of the lead terminals 13 and 14 are exposed at the bottom surface 15a of the package 15.

The anode lead terminal 13 and the cathode lead terminal 14 are formed with standing pieces 18 and 19 which are embedded in the package 15 so that the outer surfaces thereof are exposed at the side surfaces 15b and 15c of the package 15, respectively. Each of the standing pieces 18 and 19 has a width which is smaller than the width of the corresponding lead terminal 13 or 14.

With such a structure, the weight of the standing pieces 18 and 19 can be reduced as compared with the case where the width of the standing pieces 18, 19 is equal to the width of the lead terminals 13, 14.

To manufacture the solid electrolytic capacitor 11 having the above-described structure, it is preferable to employ the method described below.

Figure 10:
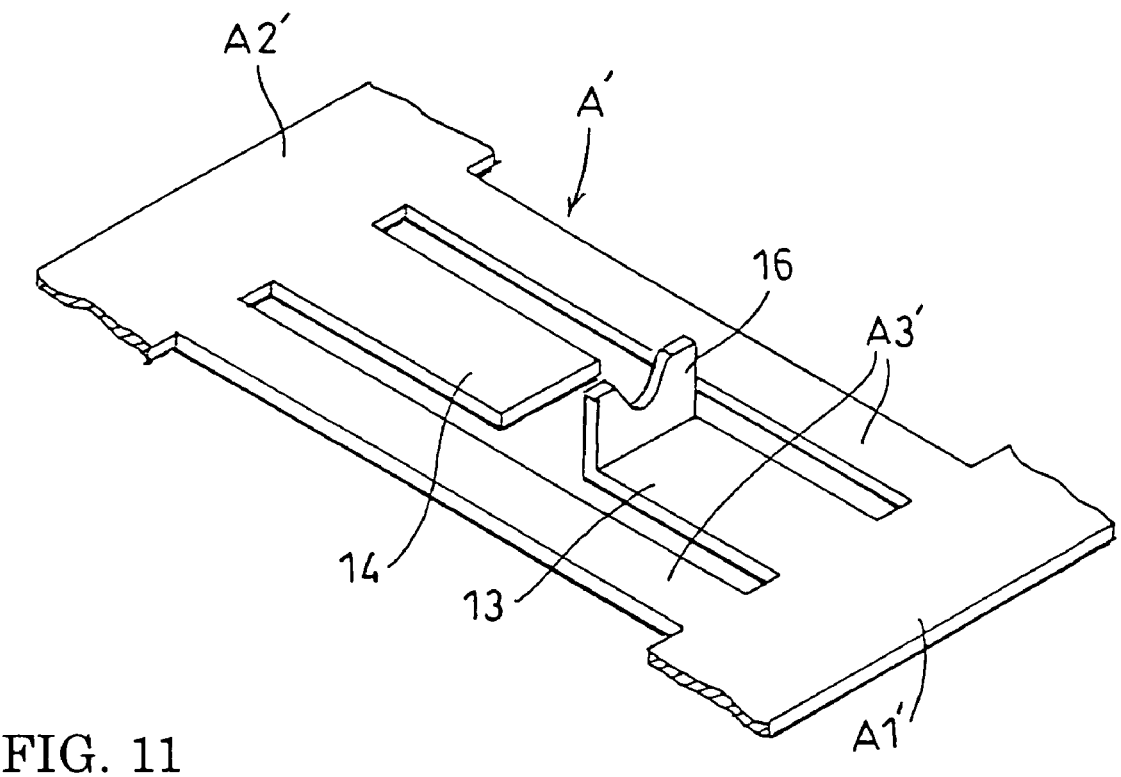
FIG. 10 is a perspective view showing a lead frame used for manufacturing the solid electrolytic capacitor of the second embodiment.

As a first step, a lead frame A' shown in FIG. 10 is prepared by punching a non-illustrated metal plate.

The lead frame A' includes a pair of side frame portions A1' and A2' which are integrally connected to each other by tie bars A3' spaced from each other. Between the tie bars A3', an anode lead terminal 13 integrally extending inward from the side frame portion A1' and a cathode lead terminal 14 integrally extending inward from the side frame portion A2' are provided. One end of the anode lead terminal 13 is bent upward to provide a bent piece 16.

Figure 11:
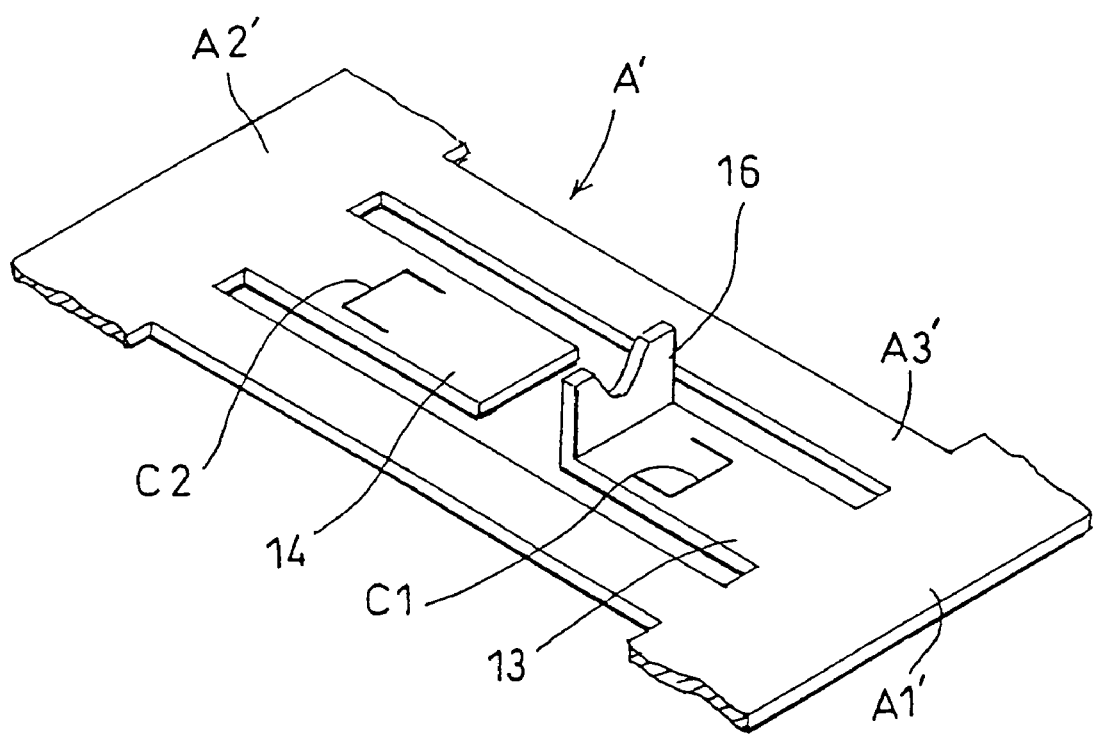
FIG. 11 is a perspective view showing a first step to manufacture the solid electrolytic capacitor of the second embodiment.
Figure 12:
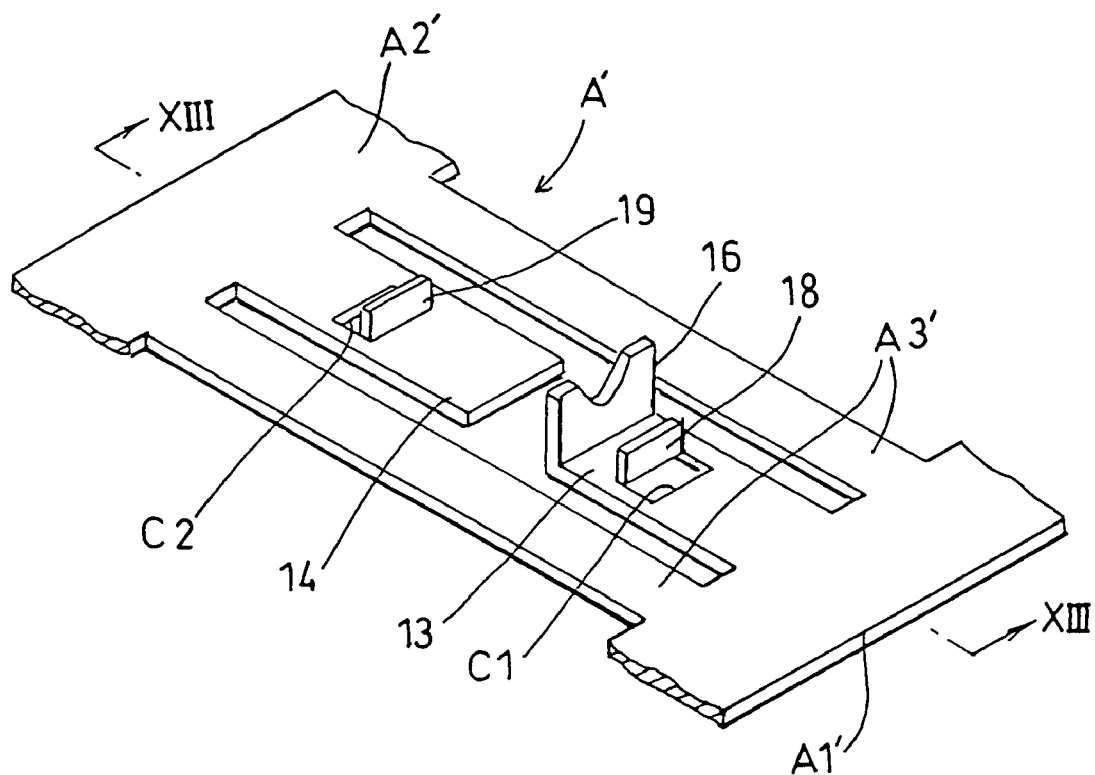
FIG. 12 is a perspective view showing a second step to manufacture the solid electrolytic capacitor of the second embodiment.
Figure 13:
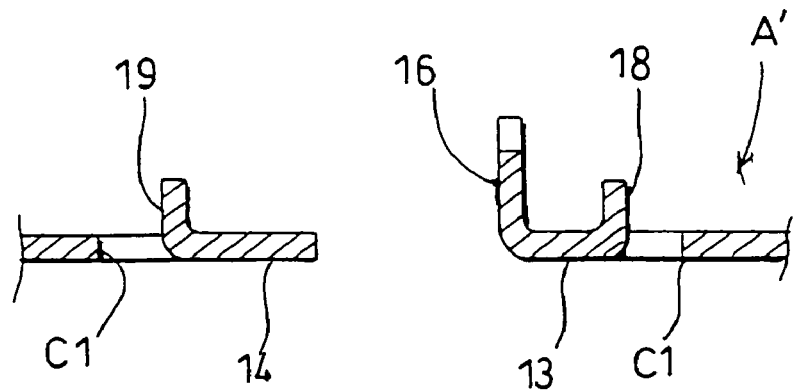
FIG. 13 is a sectional view taken along lines XIII-XIII in FIG. 12.

Subsequently, as shown in FIG. 11, channel-shaped incisions C1 and C2 are formed in the anode lead terminal 13 and the cathode lead terminal 14, respectively, and then the inner portions in the channel-shaped incisions C1 and C2 are bent upward, whereby standing pieces 18 and 19 are provided as shown in FIGS. 12 and 13.

Figure 14:
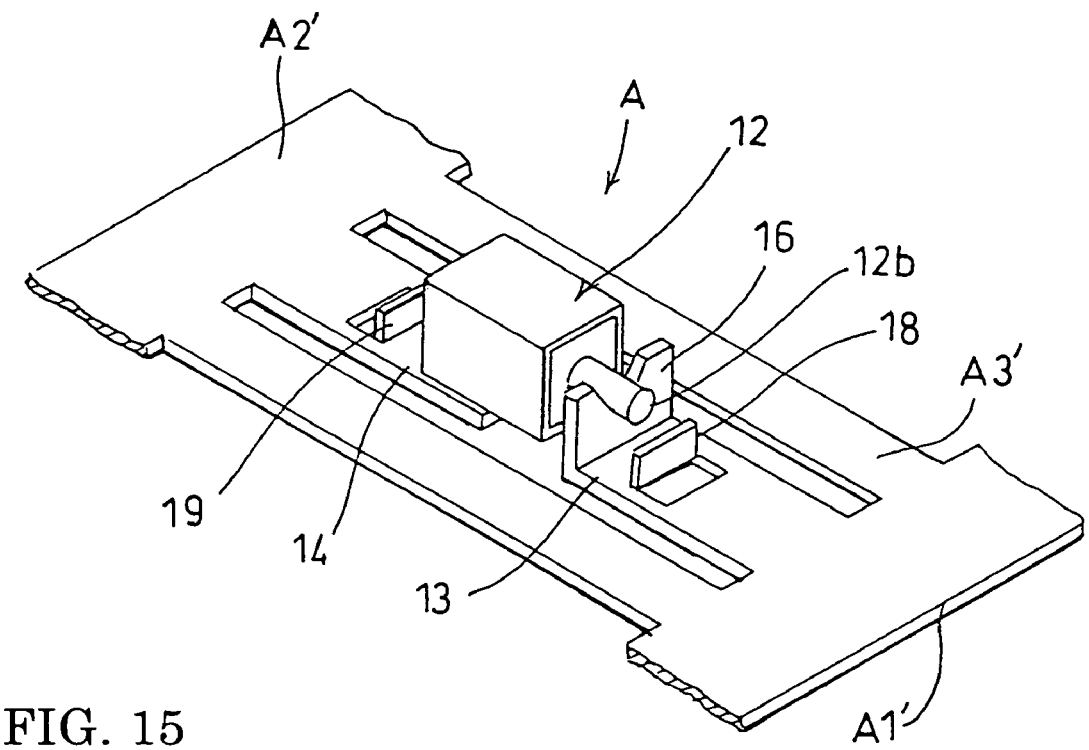
FIG. 14 is a perspective view showing a third step to manufacture the solid electrolytic capacitor of the second embodiment.
Figure 15:
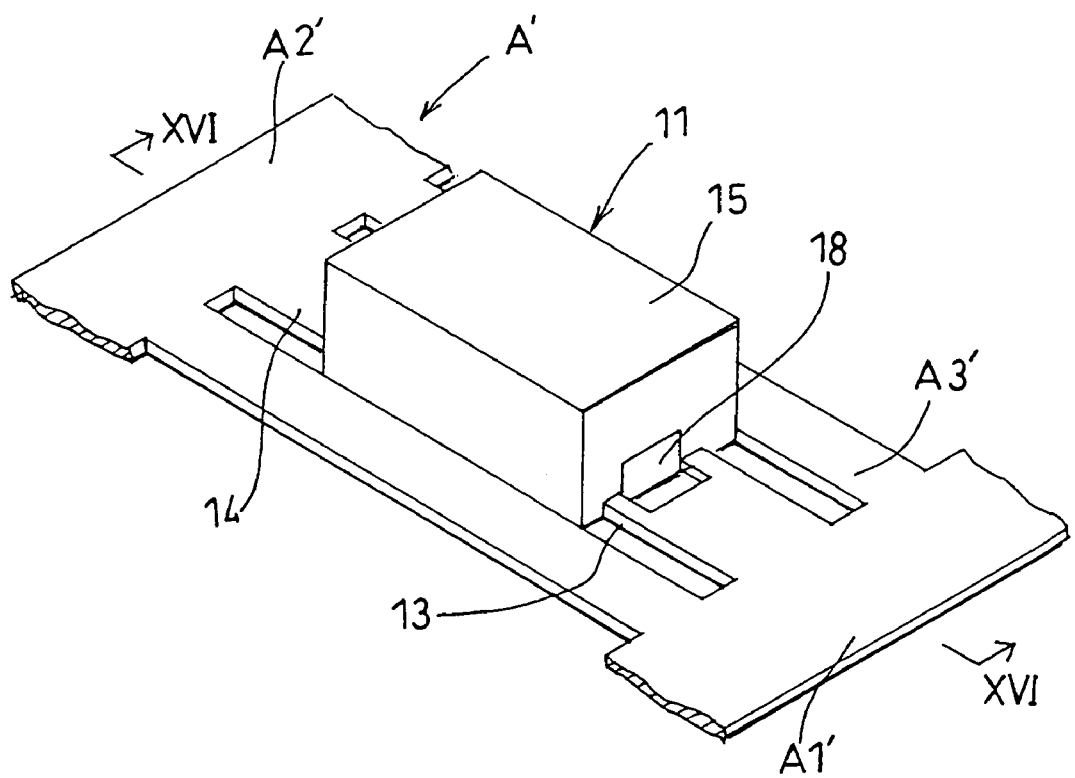
FIG. 15 is a perspective view showing a fourth step to manufacture the solid electrolytic capacitor of the second embodiment.
Figure 16:
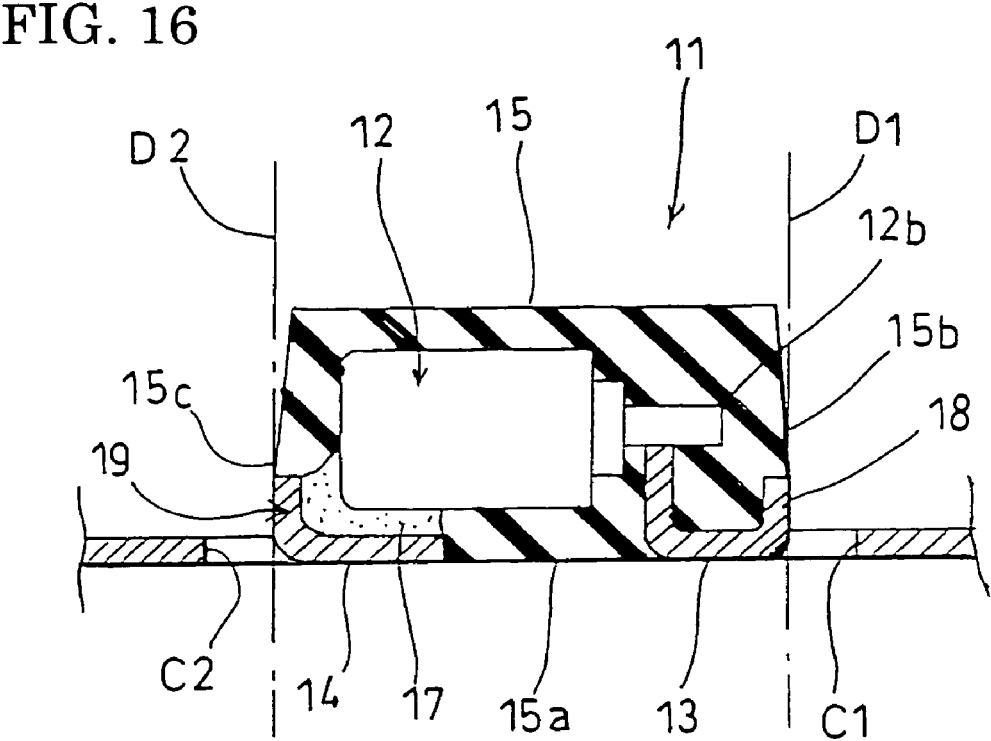
FIG. 16 is a sectional view taken along lines XVI-XVI in FIG. 15.

Subsequently, as shown in FIG. 14, a capacitor element 12 is placed between the anode lead terminal 13 and the cathode lead terminals 14. The anode bar 12b is bonded to the bent piece 16 of the anode lead terminal 13, whereas the chip body 12a is bonded to the upper surface of the cathode lead terminal 14 using conductive paste 17.

Subsequently, a package 15 for hermetically sealing the entirety of the capacitor element 12 is formed by transfer molding so that the lead terminals 13 and 14 and the standing pieces 18 and 19 are embedded in the package 15.

The molding is so performed that the lower surface of the lead terminals 13 and 14 are exposed at the bottom surface 15a of the package 15 whereas the outer surfaces of the standing pieces 18 and 19 are exposed at the side surfaces 15b and 15c of the package 15, respectively.

Subsequently, the anode lead terminal 13 and the cathode lead terminal 14 are cut along cutting lines D1 and D2 respectively corresponding to the side surface 15b and 15c of the package 15 for separation from the lead frame A'. As a result, the solid electrolytic capacitor 11 having the structure as shown in FIGS. 6-9 is obtained.

Unlike the method of the first embodiment, this manufacturing method does not utilize a tape. Therefore, the manufacturing is facilitated, and the manufacturing cost is reduced.

Figure 17:
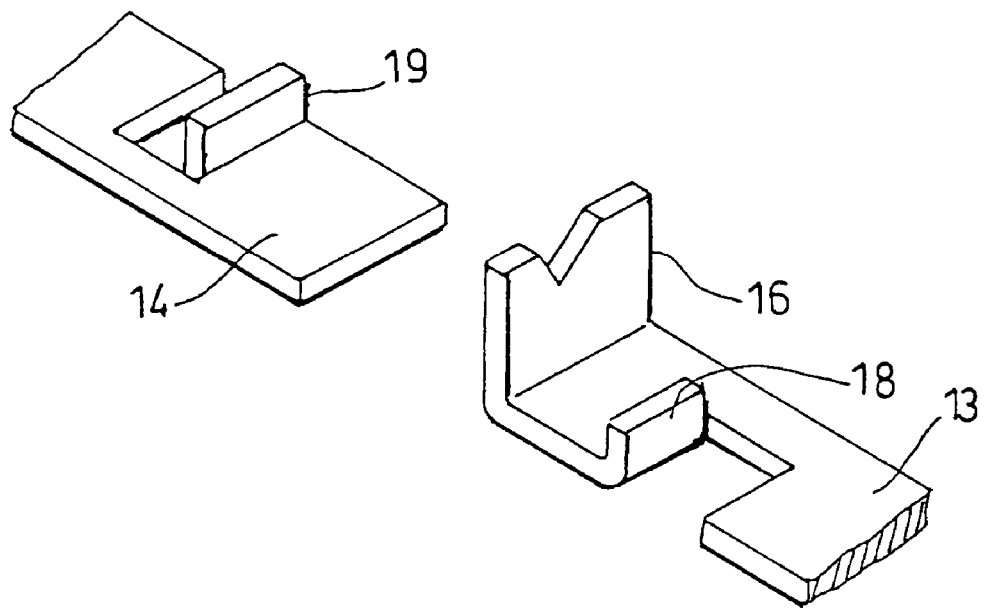
FIG. 17 is a perspective view showing another embodiment.

In the second embodiment, each of the standing pieces 18 and 19 is provided at the center in the width direction of the corresponding lead terminal 13, 14 by forming the channel-shaped incision C1, C2 in the lead terminal. However, the present invention is not limited to such a structure. For instance, as shown in FIG. 17, the standing piece may be provided at one end in the width direction of the lead terminal 13, 14.

The invention claimed is:

1. A surface-mount solid electrolytic capacitor comprising:
   a capacitor element;
   an anode lead terminal made of a metal plate and electrically connected to an anode of the capacitor element;
   a cathode lead terminal made of a metal plate and electrically connected to a cathode of the capacitor element; and
   a package made of synthetic resin and hermetically sealing the capacitor element;
   the anode lead terminal and the cathode lead terminal being embedded in a bottom of the package with lower surfaces of the anode lead terminal and the cathode lead terminal exposed at a bottom surface of the package,
   wherein each of the anode lead terminal and the cathode lead terminal is formed with a first standing piece at a portion corresponding to a side surface of the package, the first standing piece having an outer surface exposed at the side surface of the package, the first standing piece of the anode lead terminal being spaced from the anode, and wherein the anode lead terminal is formed with a second standing piece in contact with the anode within the resin package.

2. The surface-mount solid electrolytic capacitor according to claim 1, wherein each of the first standing pieces is formed at part of the corresponding lead terminal in a width direction.

3. A method for manufacturing a surface-mount solid electrolytic capacitor, the method comprising the steps of:

preparing a lead frame by punching a metal plate, the lead frame including a pair of side frame portions integrally connected to each other by a tie bar, one of the side frame portions being formed with an anode lead terminal while the other one of the side frame portions being formed with a cathode lead terminal;

removably bonding a tape to the lead frame so that the tape crosses the anode lead terminal, the cathode lead terminal and the tie bar;

separating the anode lead terminal and the cathode lead terminal from the respective side frame portions and then bending an end of each of the anode lead terminal and the cathode lead terminal to form a standing piece;

mounting a capacitor element onto the anode lead terminal and the cathode lead terminal so that an anode and a cathode of the capacitor element are electrically connected to the anode lead terminal and the cathode lead terminal, respectively;

molding a synthetic resin into a package for hermetically sealing the capacitor element so that the lead terminals are embedded in the package with a surface of each of the lead terminals and an outer surface of each of the standing pieces exposed; and removing the tape.

4. A method for manufacturing a surface-mount solid electrolytic capacitor, the method comprising the steps of:

preparing a lead frame by punching a metal plate, the lead frame including a pair of side frame portions integrally connected to each other by a tie bar, one of the side frame portions being formed with an anode lead terminal while the other one of the side frame portions being formed with a cathode lead terminal;

forming a second standing piece at the anode lead terminal of the lead frame;

forming a first standing piece at each of the anode lead terminal and the cathode lead terminal of the lead frame without separating the anode lead terminal and the cathode lead terminal from the respective side frame portions;

mounting a capacitor element onto the anode lead terminal and the cathode lead terminal so that an anode and a cathode of the capacitor element are electrically connected to the anode lead terminal and the cathode lead terminal, respectively, while the anode contacts the second standing piece;

molding a synthetic resin into a package for hermetically sealing the capacitor element so that the lead terminals are embedded in the package with a surface of each of the lead terminals and an outer surface of each of the first standing pieces exposed; and separating the anode lead terminal and the cathode lead terminal from the respective side frame portions.

* * * * *